(12) United States Patent
Teachout

(10) Patent No.: US 10,375,358 B2
(45) Date of Patent: Aug. 6, 2019

(54) INTERACTIVE, SELF-CONTAINED, FULL VIEW SURVEILLANCE, CAPTURE, AND COMMUNICATION DEVICE

(71) Applicant: Ocean 10 Security, Inc., Morrells Inlet, SC (US)

(72) Inventor: Stephen Teachout, Morrells Inlet, SC (US)

( * ) Notice: Subject to any disclaimer, the term of this patent is extended or adjusted under 35 U.S.C. 154(b) by 399 days.

(21) Appl. No.: 14/662,547

(22) Filed: Mar. 19, 2015

(65) Prior Publication Data

US 2016/0277714 A1    Sep. 22, 2016

(51) Int. Cl.
*H04N 7/18* (2006.01)

(52) U.S. Cl.
CPC .................. *H04N 7/181* (2013.01)

(58) Field of Classification Search
None
See application file for complete search history.

(56) References Cited

U.S. PATENT DOCUMENTS

| | | | |
|---|---|---|---|
| 5,359,363 A | 10/1994 | Kuban et al. | |
| 5,636,101 A * | 6/1997 | Bonsall | G06F 1/181 361/679.27 |
| 6,064,430 A | 5/2000 | Lefkowitz | |
| 8,520,070 B1 | 8/2013 | Englander et al. | |
| 2005/0239544 A1 | 10/2005 | Steelman et al. | |
| 2007/0047641 A1 | 3/2007 | Bellinson et al. | |
| 2007/0091177 A1 | 4/2007 | West et al. | |
| 2007/0126998 A1 * | 6/2007 | Ong | H04M 1/27455 355/2 |
| 2010/0013984 A1 * | 1/2010 | Loiacono | G03B 17/08 348/373 |
| 2010/0271394 A1 * | 10/2010 | Howard | G06F 3/011 345/633 |
| 2014/0333774 A1 | 11/2014 | Hsu | |
| 2014/0347440 A1 * | 11/2014 | Hatcher | B60R 11/04 348/36 |
| 2015/0094118 A1 * | 4/2015 | Rodolico | H04M 1/0264 455/566 |
| 2015/0222517 A1 * | 8/2015 | McLaughlin | H04L 67/303 713/156 |

* cited by examiner

*Primary Examiner* — Xiaolan Xu
(74) *Attorney, Agent, or Firm* — T D Foster; Jonathan Kidney

(57) ABSTRACT

A self-contained interactive surveillance device is described. The device includes multiple cameras placed about the device to cover a full-view area. The device includes environmental monitoring and control elements that are able to maintain a specified operating environment within an enclosure of the device. The device includes wireless communication capabilities that allow the device to interact with external devices over one or more wireless pathways. The device includes a user interface console that allows two-way audio video communication via the device.

12 Claims, 8 Drawing Sheets

INTERACTIVE, SELF-CONTAINED, FULL VIEW SURVEILLANCE, CAPTURE, AND COMMUNICATION DEVICE

BACKGROUND

Many private and public entities wish to monitor various locations. Current solutions require deployment of multiple cameras in various configurations around an area. Such cameras may require an individual to view the camera output and control the camera position in real time in order to monitor the entire area associated with the camera.

In addition, current solutions provide one-way interaction whereby recorded video may be passed to a monitor or recording element for storage or viewing. Such solutions do not allow a person or resource monitoring the camera to interact with individuals at the scene of the monitoring device.

Current solutions also require expert installation including placement of multiple devices, connecting wiring to the devices, and/or programming the devices.

Existing solutions that utilize internet protocol cameras may be susceptible to malfunction or reduced functionality when exposed to certain environmental conditions (e.g., heat, cold, humidity, etc.).

Furthermore, current solutions require a server or other resource that aggregates and stores data from multiple cameras. Such systems require massive amounts of processing power and storage at the server in order to manage data received from a large number of cameras.

Thus there is a need for a plug-and-play, interactive, environmentally robust monitoring device that automatically monitors the full area associated with the device and is able to process and store data locally.

SUMMARY

Some embodiments may provide ways to monitor an area. One or more surveillance devices may be placed about the area. Each surveillance device may include multiple fixed cameras that are oriented such that a full view area around the surveillance device is able to be monitored. In some embodiments, four cameras are oriented at ninety degree intervals about the surveillance device. Each camera may be able to capture vide and/or audio data. The cameras may be able to store captured data or send the captured data to another resource for storage.

The surveillance device may include wireless communication capabilities that allow communication with various devices over various types of paths (e.g., cellular networks, wireless networks, wireless links, etc.). The surveillance device may send captured data across such paths to one or more external devices. The captured data may be sent at regular intervals, as a streaming feed, based upon a received request, and/or based on other relevant factors.

The surveillance device may include a user interface console that allows two-way audio video communications. Such a console may be activated by a user at the device (e.g., by pushing a "call" button) or remotely by an administrator (e.g., by accessing the device over a secure wireless channel).

The surveillance device may include environmental monitoring elements that are able to measure various environmental parameters (e.g., temperature, humidity, etc.). The measured parameters may be used to manage various environmental control elements included within the surveillance device (e.g., a cooling fan, a heater, etc.).

Each surveillance device may be implemented using a single enclosure that houses various device elements (e.g., the environmental monitoring and control elements, processors and storages, communication elements, etc.). The cameras may be mounted to the enclosure such that the device may automatically provide full coverage of an area when the enclosure is mounted to a physical support (e.g., a pole, column, etc.).

The preceding Brief Summary is intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are illustrated in the following drawings.

DETAILED DESCRIPTION

The following detailed description describes currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another or in combination with other features. Broadly, some embodiments of the present invention generally provide a self-contained, wireless, interactive surveillance device.

A first exemplary embodiment provides a surveillance device that includes a set of fixed cameras, each camera able to capture video associated with an area facing the camera, a user interface console able to provide two-way communication with a user, an environmental control module able to monitor and alter environmental conditions affecting the surveillance device, and a communication module able to send and receive data across at least one communication pathway.

A second exemplary embodiment provides a surveillance system that includes a user device able to communicate over a wireless communication path, and a set of surveillance devices, each surveillance device having a set of fixed cameras, each camera able to capture video associated with an area facing the camera, a wireless communication module able to communicate over the wireless communication path, and an environmental control module able to monitor and control the internal environment of the surveillance device.

A third exemplary embodiment provides an automated method for monitoring an outdoor area. The method includes: providing a set of four cameras oriented about an enclosure at ninety degree intervals, receiving video captured by each camera in the set of cameras, and storing the received video.

Several more detailed embodiments of the invention are described in the sections below. Section I provides a conceptual description of the physical architectures used by some embodiments. Section II then describes various methods of operation used by some embodiments. Lastly, Section III describes a computer system which implements some of the embodiments of the invention.

I. Architecture

Sub-section I.A provides a conceptual description of an enclosure provided by some embodiments. Sub-section I.B then describes a conceptual device architecture of some embodiments. Lastly, sub-section I.C describes a conceptual system architecture of some embodiments.

A. Device Enclosure

Figure 1:
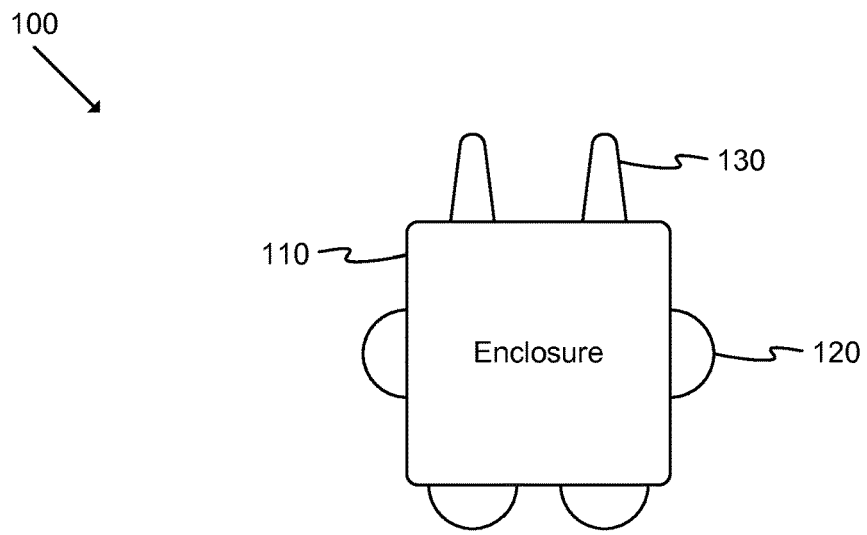
FIG. 1 illustrates a front view of a conceptual surveillance device according to an exemplary embodiment of the disclosure.

FIG. 1 illustrates a front view of a conceptual surveillance device 100 according to an exemplary embodiment of the disclosure. As shown, the device may include an enclosure 110, a set of cameras 120, and a set of antennas 130.

The enclosure 110 may be a weather-proof container. In some embodiments, the enclosure includes a front portion and a rear portion connected by a hinge. The front portion and rear portion may be coupled in various appropriate ways (e.g., using a set of latches, using one or more locks, etc.). The enclosure may include one or more gaskets or other seals placed between the front and rear portion.

Figure 2:
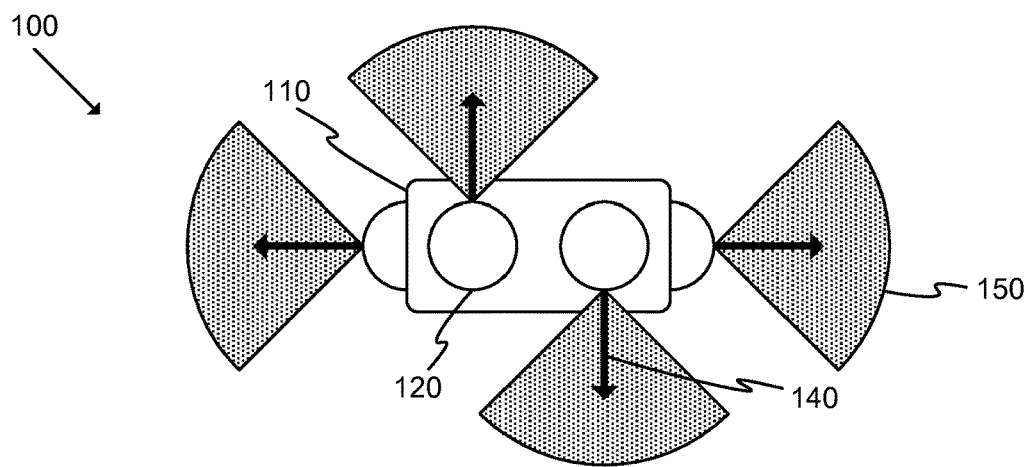
FIG. 2 illustrates a bottom view of the surveillance device of FIG. 1, showing camera pointing used by some embodiments.

FIG. 2 illustrates a bottom view of the surveillance device 110 showing camera pointing used by some embodiments. As shown, the cameras 120 are oriented such that the four stationary cameras in this example are able to provide coverage of a full three hundred sixty degree area around the device 100. Each camera has an associated direction 140 with an associated field of view 150. In this example, the fields of view are shown in a horizontal direction relative to the camera orientation. Each camera 120 also has a vertical field of view that may provide an appropriate range of video coverage for monitoring an area. The cameras may provide high-definition video content. The cameras may include night-vision capabilities.

Figure 3:
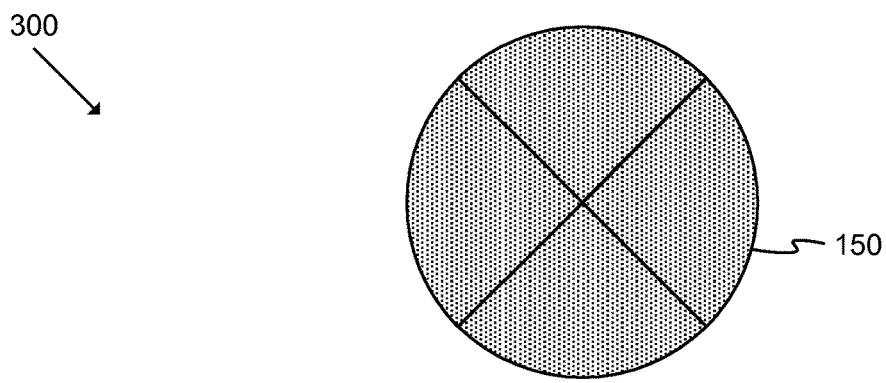
FIG. 3 illustrates a top view of a coverage area provided by the surveillance device of FIG. 1.

FIG. 3 illustrates a top view of a coverage area 300 provided by the surveillance device 100. In the example of FIG. 2, the coverage areas of the cameras are shown as non-overlapping. However, the positions of the cameras 120 are close enough (e.g., separated by inches), when considered relative to the ranges 150 of the cameras (e.g., each camera may have a range extending ninety feet or more from the camera), that the cameras may provide coverage of a complete region as shown (i.e., any gaps in coverage may be unperceivable or so small that effective surveillance is not worsened).

During operation, a typical device 100 may continuously monitor an area, capturing and storing video and/or audio using all four cameras 120. Depending on various operating parameters (e.g., default settings, user-selected settings, etc.), the captured data may be provided to an external resource (e.g., a web-based resource). Such data may be provided automatically (e.g., sent at regular intervals, provided as a streaming feed, etc.), on request (e.g., data may be sent when an authenticated request is made, data may be transferred when a mobile resource is within communication range, etc.), and/or based on other appropriate criteria.

The device 100 may continuously monitor the internal operating conditions and adjust fan speed, heater output, and/or other appropriate elements to maintain desired operating conditions.

In addition, the device may continuously monitor the console 420 (or portions thereof, such as an activation button) to determine whether a user is attempting to interact with the console. When the device 100 is able to connect to an external network or other resource, the device may allow live communication between the user at the console 420 and a remote user (e.g., an administrator, dispatcher, security worker, etc.). Alternatively, the device 100 may capture and store inputs received via the console 420 and/or automatically communicate with the user (e.g., by displaying a confirmation screen, by using an audio output to indicate that the user interactions were captured, etc.).

One of ordinary skill in the art will recognize that the device of FIGS. 1-3 may be implemented in various different ways without departing from the spirit of the invention. For instance, some embodiments may include more than four cameras (e.g., six or eight cameras) positioned to provide a full coverage area. In addition, some embodiments may include additional cameras pointed perpendicular to the axis shown (i.e., in addition to the cameras pointing in a horizontal direction, cameras may be pointed up and down in a vertical direction). As another example, although the range of each camera is depicted as forming a perfect quadrant, physical cameras may have ranges with greater than ninety degrees of spread.

B. Device Architecture

Figure 4:
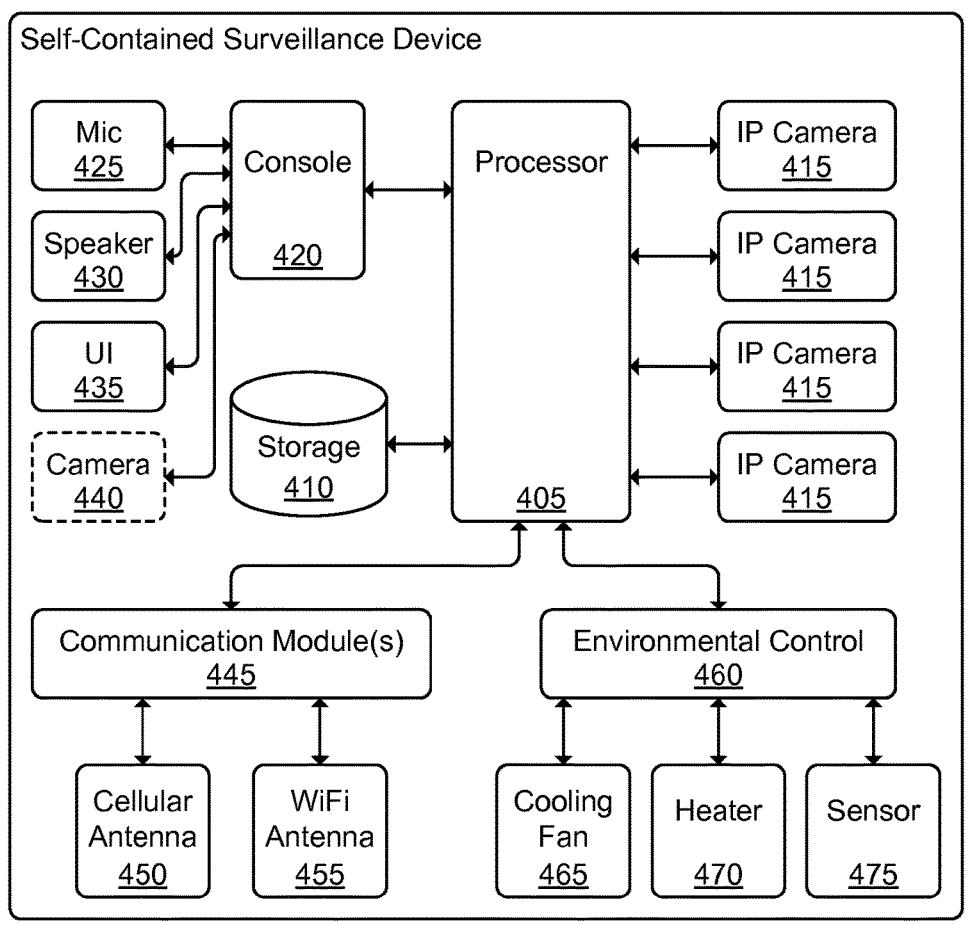
FIG. 4 illustrates a schematic block diagram of the surveillance device of FIG. 1.

FIG. 4 illustrates a schematic block diagram of the surveillance device 100. As shown, the device may include a processor 405 (with associated storage(s) 410), multiple cameras 415, a console 420 (with associated mic 425, speaker 430, UI elements 435, and camera 440), one or more communication modules 445 (with associated antennas 450-455), and an environmental control module 460 (with associated fan 465, heater 470, and sensors 475).

The processor 405 may be able to process sets of instructions and/or manipulate data as appropriate. The storage 410 may be able to store sets of instructions and data used by the processor 405 and/or other system elements. In some embodiments, the storage 410 may have a capacity such that sixty days of video may be stored locally at the device 100.

Each camera 415 may be an internet protocol (IP) camera. Each camera, in addition to optical elements (e.g., single or multi-focus lenses, brightness sensors, distance sensors, etc.) may include various electronic components (e.g., processors, storages, etc.) that may allow the camera to capture, store, and provide video data. In some embodiments, the cameras may capture, store, and/or provide audio data as well as video data (e.g., each camera may include a set of microphones).

The console 420 may allow users to communicate via the device 100. The console may interact with one or more microphones 425, speakers 430, other UI elements 440 (e.g., buttons, keypads, displays, touchscreens, etc.), and/or one or more cameras 440. One or more of the cameras 415 may be used to capture video for use by the console 420. In addition, some or all of the cameras 415 may include components such as microphones, speakers, etc. that may allow for interaction with a user. In some embodiments, the console 420 may have a housing that is separated from the enclosure 110. For instance, in some embodiments, the console 420 may be mounted at a slightly different location than the enclosure 110 and may interact with other device components via one or more wired or wireless connections.

Each communication module 445 may allow communication between the device 100 and various external components. Such components will be discussed in more detail in reference to FIG. 5 below. Returning to FIG. 4, the communication module 445 may interact with various components such as a cellular antenna 450 and a Wi-Fi antenna 455. Some embodiments may include multiple types of each antenna (e.g., 3G wireless and 4G wireless) and/or other types of elements that may allow communication with external components (e.g., Bluetooth communication, radio communication, etc.). The antennas 450 and 455 may include various hardware elements, interfaces, etc. that may be able to receive data from the communication module 445 and generate the appropriate output signals and/or to receive signals via the antennae 450 and 455 and generate data appropriate for the communication module 445.

The environmental control module 460 may be able to receive data from the sensors 475 (e.g., temperature data, humidity data, etc.) and use the received data to control elements such as the cooling fan 465 and heater or heating element 470. Some embodiments may include various other environmental elements such as a dehumidifier, air conditioner, etc. Each sensor 475 may include a sensing element, electronic circuitry, and/or other appropriate components. The sensors 475 may typically be mounted inside the enclosure to measure operating condition of the device components.

One of ordinary skill in the art will recognize that device 100 may be implemented in various different ways. For instance, some embodiments may include power generation and/or storage elements (e.g., solar cells, batteries, etc.). In addition, different embodiments may have different components arranged in various different ways (e.g., some embodiments may include multiple devices, where each device includes a processor or other element, and the devices communicate using wired paths). As another example, some components may operate without any interaction with any other components (e.g., the cooling fan may be connected to a sensor such that the cooling fan automatically engages above a specified threshold temperature).

C. System Architecture

Figure 5:
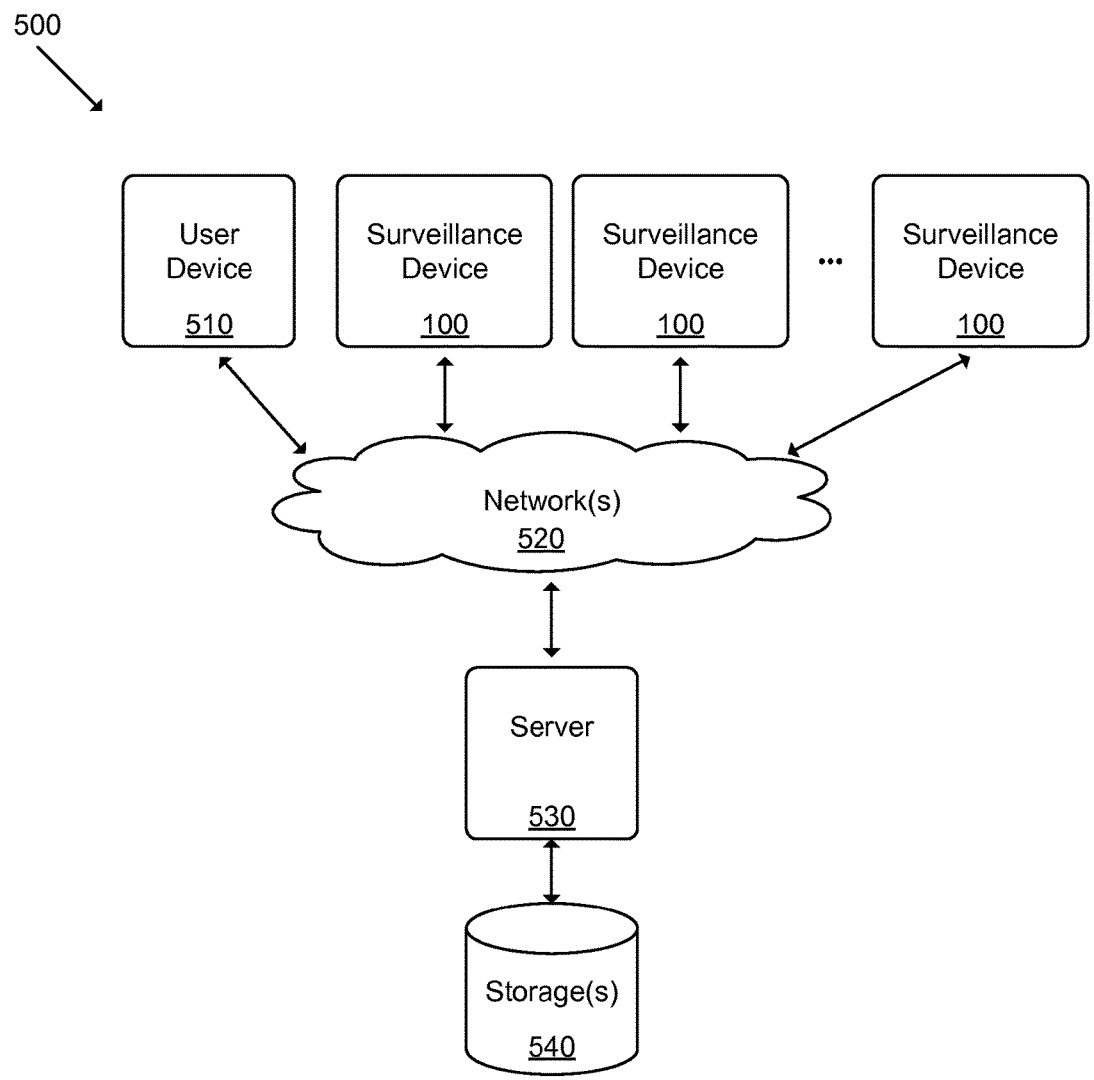
FIG. 5 illustrates a schematic block diagram of a distributed system that utilizes the surveillance device of FIG. 1.

FIG. 5 illustrates a schematic block diagram of a distributed system 500 that utilizes surveillance device 100. As shown, the system 500 may include one or more user devices 510, a set of surveillance devices 100, a set of networks 520, one or more servers 530, and a set of storages 540.

The user device 510 may be any device capable of communicating across a network 520, such as a smartphone, a personal computer, a tablet, monitor, etc. The network 520 may include various devices and/or pathways and may include local networks (e.g., wireless networks), distributed networks (e.g., the Internet), cellular networks, and/or other appropriate communication pathways.

The server 530 may be a set of devices capable of communicating across the networks 520, executing instructions, and/or manipulating data. The storages 540 may be able to receive, store, and/or retrieve data and/or instructions.

During operation, the security devices 100 may operate as described above, by capturing video and/or audio data, interacting with users, etc. In some embodiments, a set of security devices may be able to communicate with each other (e.g., via a local or distributed network).

When a user such as a system administrator wishes to retrieve surveillance data, the user may access the system using user device 510. Such access may be provided via a web portal, a dedicated application, and/or other appropriate resource. In some cases, such as when a user is within close range of a surveillance device 100, the user device 510 may interact with the surveillance device 100 directly. Alternatively, the user device 510 may interact with the surveillance device 100 over the network 520.

In some cases, data received from the devices 100 may be received and stored by the server 530 and storage 540. The user device 510 may then retrieve the data from the server 530 over the network 520.

The system 500 may be implemented in various different ways. For instance, in some cases, all components may be associated with a single entity or even single location (e.g., a large retail store with multiple cameras placed about the premises with the cameras, local server, and user device able to communicate via a local area network). As another example, the components may be associated with different entities or locations (e.g., multiple cameras associated with a single security outfit that are placed at different unrelated, locations and accessed via a wide area network).

II. Methods of Operation

Figure 6:
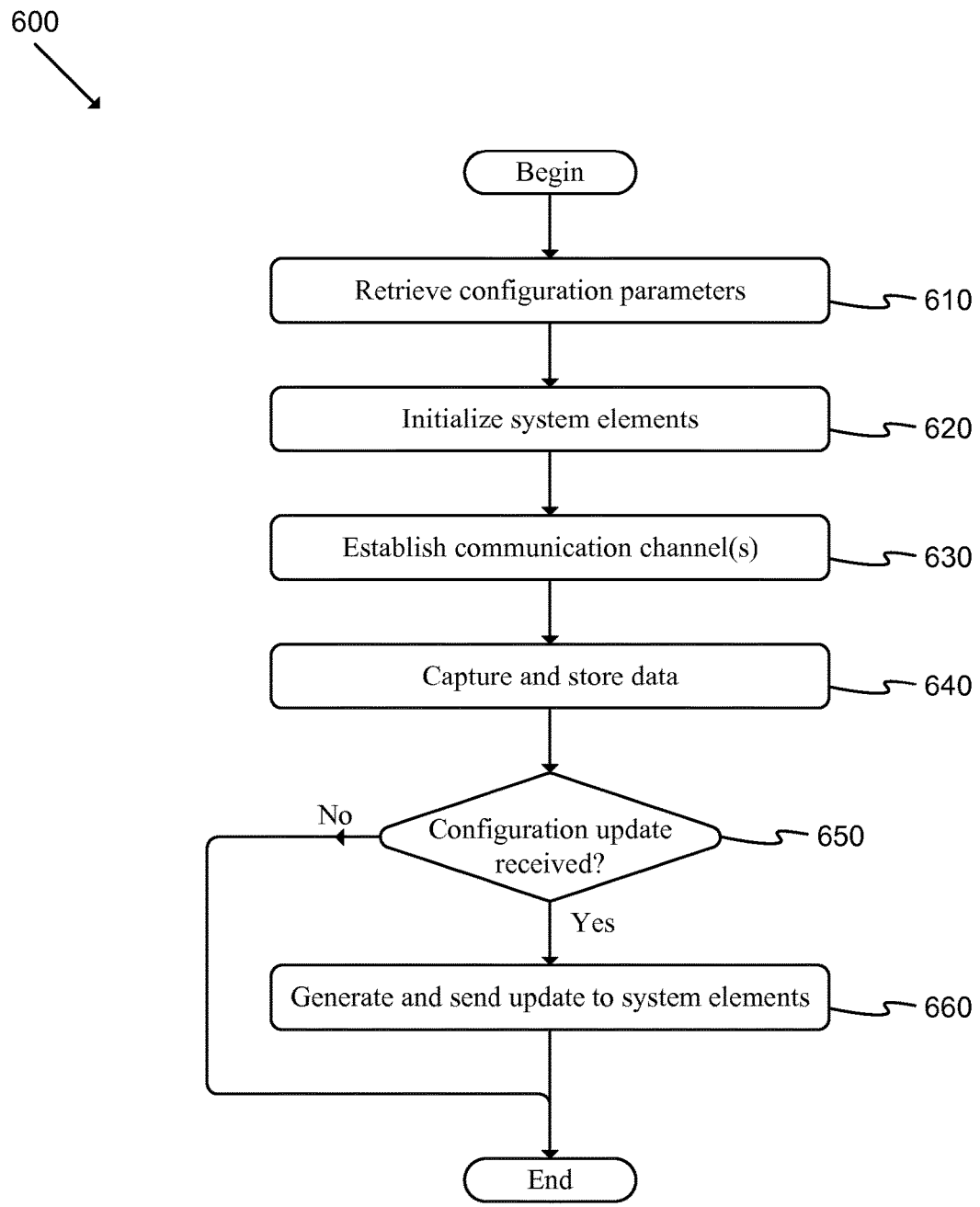
FIG. 6 illustrates a flow chart of a conceptual process used by some embodiments to monitor an area using the surveillance device of FIG. 1.

FIG. 6 illustrates a flow chart of a conceptual process 600 used by some embodiments to monitor an area using surveillance device 100. Such a process may be executed by an element such as processor 405. The process may begin, for instance, when device 100 is turned on.

As shown, the process may retrieve (at 610) a set of configuration parameters. Such parameters may include capture parameters (e.g., video resolution, frame rate, etc.), operating parameters (e.g., threshold temperatures, maximum power, etc.), and/or other appropriate parameters.

Next, the process may initialize (at 620) the system elements. Such initialization may involve sending operating instructions to the elements, providing thresholds or other data, generating a reset signal, etc.

Process 600 may then establish (at 630) various communication channels. Such channels may include, for instance, channels to other surveillance devices, network communication channels, communication links to user devices, etc.

Next, the process may capture and store (at 640) data based at least partly on the set of configuration parameters. The process may then determine (at 650) whether a configuration update has been received. Such a determination may be made in various appropriate ways. For instance, the process may determine that an update was received over an open communication channel from an authenticated element (e.g., a monitor-user may identify an event and request audio in addition to video). As another example, the process may automatically update configuration parameters based on various specified criteria (e.g., power usage for solar-based devices may be increased during the daytime and decreased at night).

If the process determines (at 650) that an update was received, the process may then generate and send (at 660) updated configuration data to the affected system elements and then end. If the process determines (at 650) that no update was received, the process may then end.

Process 600 (or portions thereof) may be repeated iteratively, at regular intervals, and/or based on some other criteria.

Figure 7:
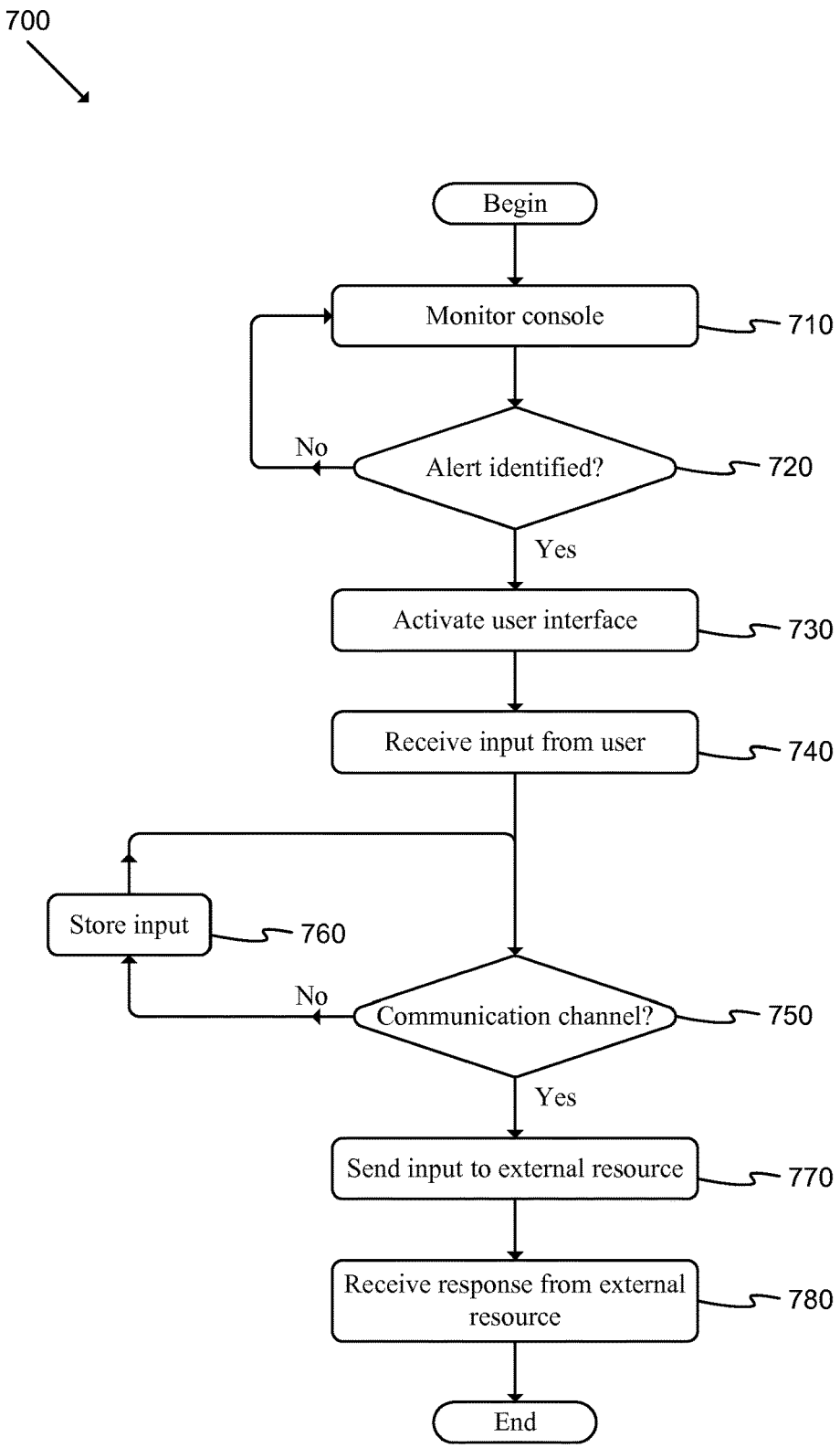
FIG. 7 illustrates a flow chart of a conceptual process used by some embodiments to provide a communication pathway using the surveillance device of FIG. 1.

FIG. 7 illustrates a flow chart of a conceptual process 700 used by some embodiments to provide a communication pathway using the surveillance device 100. Some embodiments may include an emergency call console that allows a user to interact with the device (and/or a monitor-user able to communicate via the device). Such a process may be performed by console 420. The process may begin, for instance, when the device 100 is powered on.

As shown, the process may monitor (at 710) the console. The process may then determine (at 720) whether an alert was identified. Such an alert may be identified in various appropriate ways. For instance, the alert may be associated with an operation or set of operations (e.g., pushing an emergency call button). As another example, a monitor-user may identify an event while monitoring video captured by a device and attempt to interact with someone at the scene.

If the process determines (at 720) that no alert was identified, the process may repeat operations 710-720 until the process determines (at 720) that an alert was identified. If the process determines (at 720) that an alert was identified, the process may activate (at 730) a user interface. Such a user interface may include elements such as buttons, keypad, microphone, speakers, display, touchscreen, lighted indicators, etc.

Next, the process may receive (at 740) input from the user (e.g., via a camera and microphone, via a keypad or touchscreen, etc.). The process may then determine (at 750) whether there is an available communication channel, such as a channel to a dispatcher or 911 operator, a channel to a monitor-user, etc. If the process determines (at 750) that there is not a communication channel available, the process may store (at 760) the received input and return to operation 750.

If the process determines (at 750) that there is a communication channel available, the process may send (at 760) the received input to an external resource (e.g., a device associated with a monitor-user) and receive (at 780) a response from the external resource (e.g., video, audio, and/or text communications) and then end. Even when a communication channel is available, the received input may be stored.

Operations 740-780 may be performed iteratively during an ongoing communication session until some termination criteria is identified (e.g., either party to the communication indicates that the communication is over by pressing a button or entering some command, after a time threshold is exceeded in an unmonitored situation, etc.).

Figure 8:
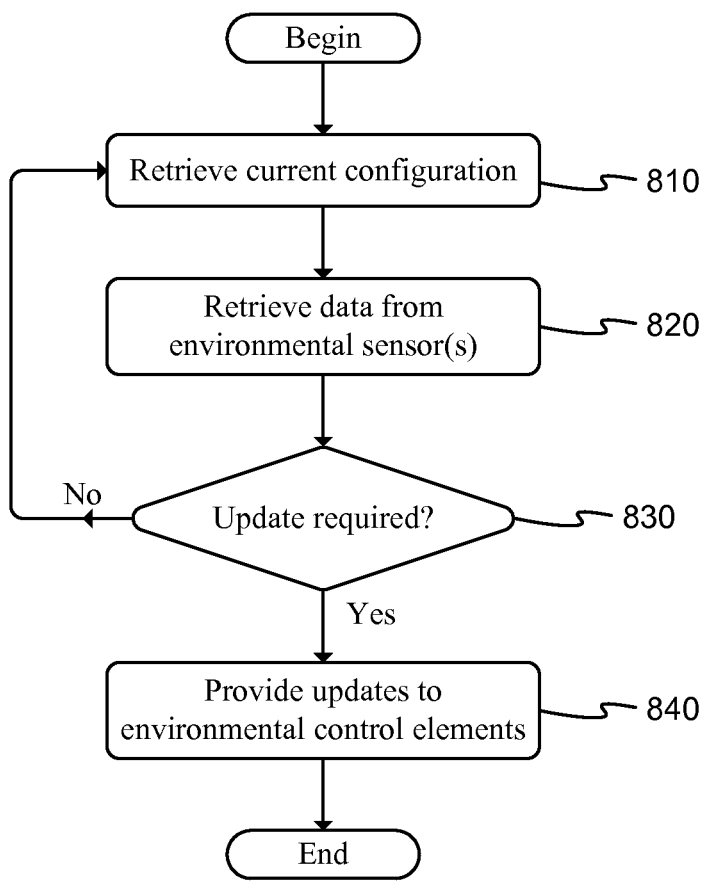
FIG. 8 illustrates a flow chart of a conceptual process used by some embodiments to maintain a specified operating environment for the surveillance device of FIG. 1.

FIG. 8 illustrates a flow chart of a conceptual process 800 used by some embodiments to maintain a specified operating environment for surveillance device 100. Such a process may be performed by environmental control module 460. The process may begin, for instance, when a device 100 is powered on.

As shown, the process may retrieve (at 810) a current configuration. Such a configuration may include, for instance, status of a fan (e.g., state and/or speed), status of a heater (e.g., state such as on or off), etc. Next, the process may retrieve (at 820) data from the available environmental sensors. The process may then determine (at 830) whether an update to the current configuration is required. Such a determination may be made in various appropriate ways (e.g., by determining whether an environmental parameter, such as temperature, has exceeded a threshold).

If the process determines (at 830) that no update is required, the process may repeat operations 810-840 until the process determines (at 830) that an update is required.

If the process determines (at 830) that an update is required, the process may provide (at 840) updates to the appropriate environmental control elements and then may end. For instance, the process may turn on a fan, increase fan speed, etc.

Process 800 may be performed iteratively, at regular intervals, or based on some other appropriate criteria (e.g., when updated environmental data is available).

Figure 9:
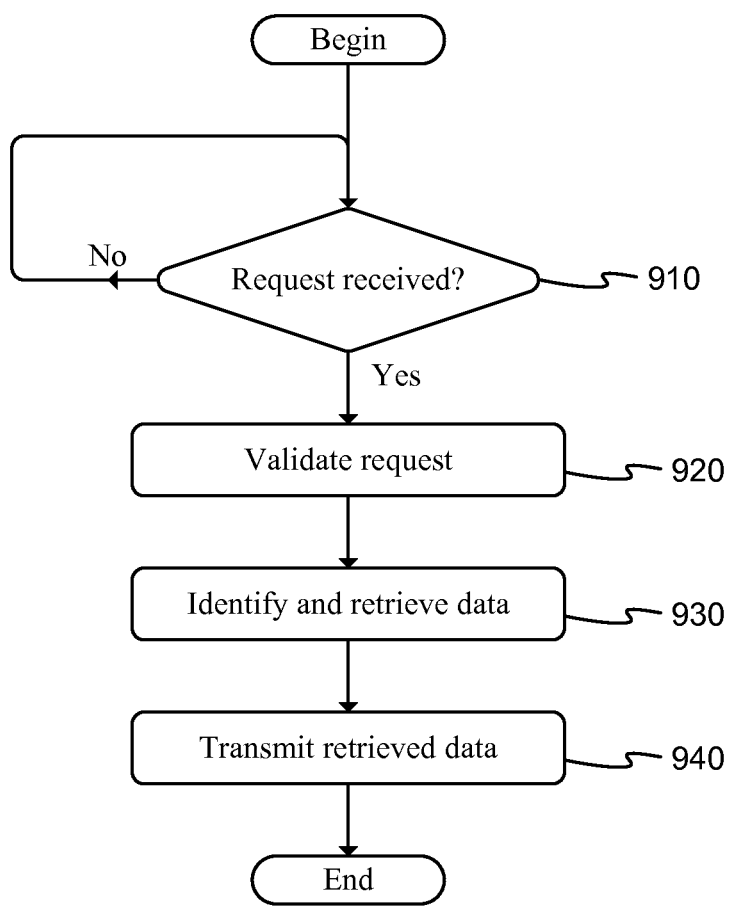
FIG. 9 illustrates a flow chart of a conceptual process used by some embodiments to provide data from the surveillance device of FIG. 1 to various external resources.

FIG. 9 illustrates a flow chart of a conceptual process 900 used by some embodiments to provide data from surveillance device 100 to various external resources. Such external resources may include user devices 510, servers 530, and/or other appropriate resources. The process may be performed by communication module 445. Process 900 may begin, for instance, when device 100 establishes a communication link to an external resource.

As shown, the process may determine (at 910) whether a request has been received. Such a determination may be made in various appropriate ways (e.g., by monitoring incoming communications, by determining that a specified time period has elapsed, etc.). In some cases, where an external resource is available over an extended period (or even permanently), the process may automatically send data at regular intervals or based on other appropriate criteria (e.g., amount of data recorded, remaining storage capacity, etc.).

If the process determines (at 910) that no request has been received, the process may repeat operation 910 until the process determines (at 910) that a request has been received. If the process determines (at 910) that a request has been received, the process may then validate (at 920) the request. Such a validation may include, for instance, receiving a username and password or other identifying data and comparing such data to a list of authorized users (or authorized groups of users, such as all employees of a security company, a group of law enforcement officers, etc.). If the process is not able to validate (at 920) the request, the process may deny access to the request and then end.

After validating (at 920) a request, the process may identify and retrieve (at 930) the appropriate data. Such data may include, for instance, all data captured since a last request, data associated with a requested time period, etc.

The process may then transmit (at 940) the retrieved data to the requestor and then may end. Such a transmission may utilize various appropriate channels (e.g., wireless networks, cellular networks, etc.).

One of ordinary skill in the art will recognize that processes 600-900 may be performed in various different ways than described. For instance, the operations may be performed in a different order, some operations may be omitted, and/or different operations may be included. As another example, each process may be divided into a set of sub-processes or included as part of a larger macro-process. Each process, or portions thereof, may be performed iteratively, at regular intervals, and/or based on some other appropriate criteria.

III. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be adapted to perform functions and/or features that may be associated with various software elements described throughout.

Figure 10:
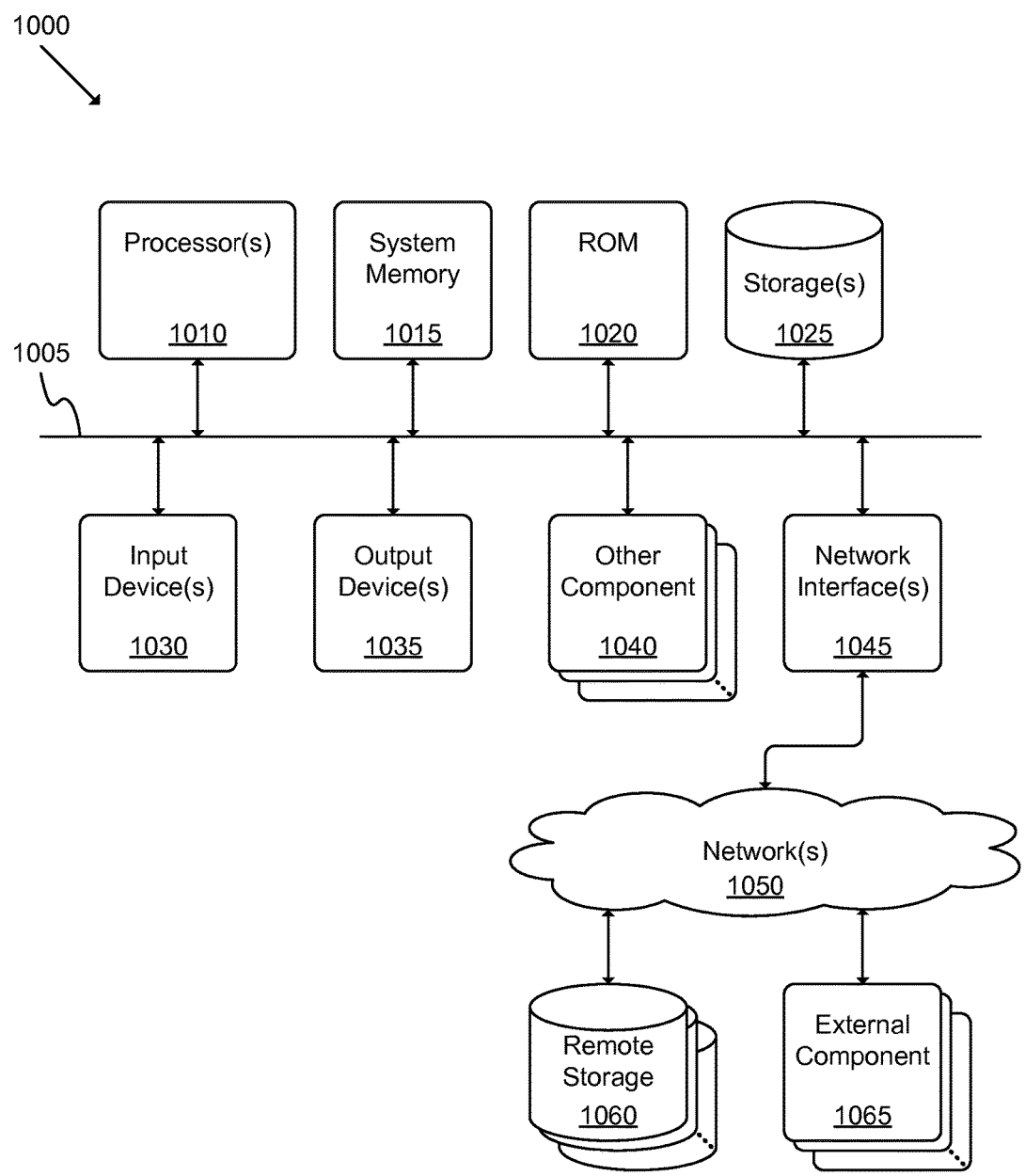
FIG. 10 illustrates a schematic block diagram of a conceptual computer system used to implement some embodiments of the invention.

FIG. 10 illustrates a schematic block diagram of a conceptual computer system 1000 used to implement some embodiments of the invention. For example, the system described above in reference to FIGS. 1-5 may be at least partially implemented using computer system 1000. As another example, the processes described in reference to FIGS. 6-9 may be at least partially implemented using sets of instructions that are executed using computer system 1000.

Computer system 1000 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 1000 may include at least one communication bus 1005, one or more processors 1010, a system memory 1015, a read-only memory (ROM) 1020, permanent storage devices 1025, input devices 1030, output devices 1035, various other components 1040 (e.g., a graphics processing unit), and one or more network interfaces 1045.

Bus 1005 represents all communication pathways among the elements of computer system 1000. Such pathways may include wired, wireless, optical, and/or other appropriate communication pathways. For example, input devices 1030 and/or output devices 1035 may be coupled to the system 1000 using a wireless connection protocol or system.

The processor 1010 may, in order to execute the processes of some embodiments, retrieve instructions to execute and/or data to process from components such as system memory 1015, ROM 1020, and permanent storage device 1025. Such instructions and data may be passed over bus 1005.

System memory 1015 may be a volatile read-and-write memory, such as a random access memory (RAM). The system memory may store some of the instructions and data that the processor uses at runtime. The sets of instructions and/or data used to implement some embodiments may be stored in the system memory 1015, the permanent storage device 1025, and/or the read-only memory 1020. ROM 1020 may store static data and instructions that may be used by processor 1010 and/or other elements of the computer system.

Permanent storage device 1025 may be a read-and-write memory device. The permanent storage device may be a non-volatile memory unit that stores instructions and data even when computer system 1000 is off or unpowered. Computer system 1000 may use a removable storage device and/or a remote storage device as the permanent storage device.

Input devices 1030 may enable a user to communicate information to the computer system and/or manipulate various operations of the system. The input devices may include keyboards, cursor control devices, audio input devices and/or video input devices. Output devices 1035 may include printers, displays, and/or audio devices. Some or all of the input and/or output devices may be wirelessly or optically connected to the computer system.

Other components 1040 may perform various other functions. These functions may include performing specific functions (e.g., graphics processing, sound processing, etc.), providing storage, interfacing with external systems or components, etc.

Finally, as shown in FIG. 10, computer system 1000 may be coupled to one or more networks 1050 through one or more network interfaces 1045. For example, computer system 1000 may be coupled to a web server on the Internet such that a web browser executing on computer system 1000 may interact with the web server as a user interacts with an interface that operates in the web browser. Computer system 1000 may be able to access one or more remote storages 1060 and one or more external components 1065 through the network interface 1045 and network 1050. The network interface(s) 1045 may include one or more application programming interfaces (APIs) that may allow the computer system 1000 to access remote systems and/or storages and also may allow remote systems and/or storages to access computer system 1000 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1000 may be used in conjunction with the invention. Moreover, one of ordinary skill in the art will appreciate that many other system configurations may also be used in conjunction with the invention or components of the invention.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments of the invention and modifications may be made without departing from the spirit and scope of the invention as defined by the following claims.

I claim:

1. A non-mobile phone based, dedicated surveillance device comprising:
a first pair and second pair of fixed cameras disposed about a weatherproof housing, each camera directed outwardly and able to capture and record video associated with an area facing the camera, wherein cameras of the first pair are disposed on opposite lateral sides of the housing aligned in a common horizontal axis, and cameras of the second pair are adjacently disposed within a central section of a bottom side of the housing, and positioned directly below and parallel to the common horizontal axis, wherein the alignment and positioning of the cameras about the housing provide a composite viewing area of 360 degrees in a lateral and downward direction; and a communication module configured to send and receive data including captured video across at least one communication pathway to an external server.

2. The surveillance device of claim 1 further comprising an environmental control module able to monitor and alter environmental conditions within the weatherproof housing.

3. The surveillance device of claim 2 further comprising a temperature sensor, a cooling fan, and a heating element housed in the weatherproof housing.

4. The surveillance device of claim 1 further comprising a storage able to receive and store the captured video from each of the cameras.

5. The surveillance device of claim 1, wherein the communication module is able to communicate across at least one of a cellular network, local area wireless network, and Bluetooth link.

6. The surveillance device of claim 1 further comprising at least one exposed antenna, wherein the at least one antenna is located on a top surface of the weatherproof housing.

7. The surveillance device of claim 1, wherein the weatherproof housing has a cuboid shape and comprises a front portion, a rear portion, a hinge that couples the front portion to the rear portion, and a set of latches.

8. The surveillance device of claim 1 further comprising a user interface console within the housing, configured to provide two-way audio-video communication between a user at the surveillance device and a user at a remote location, the user interface console comprising: a microphone; a camera; a speaker; and a display.

9. A self-contained non-mobile phone based, dedicated surveillance device comprising:
   a weather-proof housing comprising a front portion, a rear portion, a hinge that couples the front portion to the rear portion, and a set of latches;
   a first pair and second pair of fixed cameras disposed about the weatherproof housing, each camera directed outwardly and able to capture and record video associated with an area facing the camera, wherein cameras of the first pair are disposed on opposite lateral sides of the housing aligned in a common horizontal axis, and cameras of the second pair are adjacently disposed within a central section of a bottom side of the housing, and positioned directly below and parallel to the common horizontal axis wherein the alignment and positioning of the cameras about the housing provide a composite viewing area of 360 degrees in a lateral and downward direction;
   a user interface (UI) comprising a microphone and speaker; and
   a communication module including at least one antenna, the communication module able to send and receive data across at least one wireless communication pathway, wherein the sent data comprises data captured from the microphone and at least a portion of the received data is provided via the speaker.

10. The self-contained surveillance device of claim 9, wherein the communication module further comprises a camera and a display and wherein the sent data comprises data captured from the camera and at least a portion of the received data is provided via the display.

11. The self-contained surveillance device of claim 9 further comprising at least one environmental sensor, a cooling fan, and a heater housed within the weather-proof housing, wherein the operation of the cooling fan and the heater may be at least partly controlled based on data received from the at least one environmental sensor.

12. A mobile non-handheld, non-phone based, dedicated surveillance device comprising:
   a weather-proof housing having a cuboid shape, the weather-proof housing comprising a top surface, a bottom surface, a left surface, and a right surface;
   a plurality of antennas located along the top surface of the weather-proof housing;
   a first pair and second pair of fixed cameras disposed about a weatherproof housing, each camera directed outwardly and able to capture and record video associated with an area facing the camera, wherein cameras of the first pair are disposed on opposite lateral sides of the housing aligned in a common horizontal axis, and cameras of the second pair are adjacently disposed within a central section of a bottom side of the housing, and positioned directly below and parallel to the common horizontal axis wherein the alignment and positioning of the cameras about the housing provide a composite viewing area of 360 degrees in a lateral and downward direction;
   a user interface module comprising a microphone, speaker, camera, and display;
   a communication module able to communicate across at least one wireless communication channel via the plurality of antennas; and
   an environmental control module comprising at least one sensor, a cooling fan, and a heater.

* * * * *